United States Patent
Shioura et al.

(10) Patent No.: US 8,223,619 B2
(45) Date of Patent: Jul. 17, 2012

(54) OPTICAL RECORDING MEDIUM, REPRODUCTION APPARATUS, AND TRACKING SERVO METHOD

(75) Inventors: Kunihiro Shioura, Kanagawa (JP); Shiro Morotomi, Kanagawa (JP); Minoru Tobita, Tokyo (JP); Toshiya Murakami, Kanagawa (JP); Atsushi Umezawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1587 days.

(21) Appl. No.: 11/101,581

(22) Filed: Apr. 8, 2005

(65) Prior Publication Data

US 2005/0243697 A1 Nov. 3, 2005

(30) Foreign Application Priority Data

Apr. 26, 2004 (JP) ................................. 2004-129380

(51) Int. Cl.
*G11B 7/24* (2006.01)
(52) U.S. Cl. ........................................ 369/275.4; 369/94
(58) Field of Classification Search ............... 369/275.4, 369/53.23, 53.28, 275.3, 94, 275.1, 275.2, 369/283

See application file for complete search history.

(56) References Cited

U.S. PATENT DOCUMENTS

| | | | | |
|---|---|---|---|---|
| 5,202,875 A | * | 4/1993 | Rosen et al. | 369/94 |
| 5,452,284 A | * | 9/1995 | Miyagawa et al. | 369/44.28 |
| 5,627,816 A | * | 5/1997 | Ito et al. | 369/275.1 |
| 5,764,619 A | * | 6/1998 | Nishiuchi et al. | 369/275.1 |
| 6,063,468 A | * | 5/2000 | Aratani et al. | 428/64.1 |
| 6,343,062 B1 | * | 1/2002 | Furukawa et al. | 369/275.4 |
| 6,487,163 B1 | * | 11/2002 | Sugaya et al. | 369/275.4 |
| 6,577,566 B1 | * | 6/2003 | Tomita | 369/44.26 |
| 2003/0202436 A1 | * | 10/2003 | Tomita et al. | 369/44.26 |
| 2003/0223325 A1 | * | 12/2003 | Shimano et al. | 369/44.26 |
| 2004/0001414 A1 | * | 1/2004 | Kadowaki et al. | 369/59.24 |

FOREIGN PATENT DOCUMENTS

| | | |
|---|---|---|
| JP | 9-167381 | 6/1997 |
| JP | 2001-118261 | 4/2001 |
| JP | 2003-208723 | 7/2003 |
| JP | 2004-5864 | 1/2004 |
| JP | 2004-95126 | 3/2004 |

* cited by examiner

*Primary Examiner* — Thomas Alunkal
(74) *Attorney, Agent, or Firm* — Oblon, Spivak, McClelland, Maier & Neustadt, L.L.P.

(57) ABSTRACT

A reproduction apparatus for an optical recording medium that has a convex pit recording layer, in which pits are formed in a convex shape viewed from a laser incidence side, and a concave pit recording layer, in which pits are formed in a concave shape viewed from the laser incidence side, as recording layers in which data is recorded by pit strings, the pits being formed with a depth that is set in a range of $\lambda/4.5$ to $\lambda/6$ with respect to a laser wavelength $\lambda$, including: an optical head section that irradiates laser beams on the recording layers and detects reflected light information to read out information recorded in the recording layers; a tracking error signal generating section that generates a tracking signal; a polarity switching section that switches a polarity of the tracking error signal; and a tracking servo section that performs a tracking servo operation.

1 Claim, 9 Drawing Sheets

| PIT DEPTH | $\lambda/16$ | $\lambda/8$ | $\lambda/6$ | $\lambda/5.33$ | $\lambda/4.78$ | $\lambda/4$ |
|---|---|---|---|---|---|---|
| RF PHASE (RADIAN) | $(2/16)\pi$ | $(4/16)\pi$ | $(5.333/16)\pi$ | $(6/16)\pi$ | $(6.69/16)\pi$ | $(8/16)\pi$ |
| LEVEL | 0.383 | 0.707 | 0.866 | 0.924 | 0.967 | 1 |
| P.P. PHASE (RADIAN) | $(2/8)\pi$ | $(4/8)\pi$ | $(5.333/8)\pi$ | $(6/8)\pi$ | $(6.69/8)\pi$ | $(8/8)\pi$ |
| LEVEL | 0.707 | 1 | 0.866 | 0.707 | 0.492 | 0 |

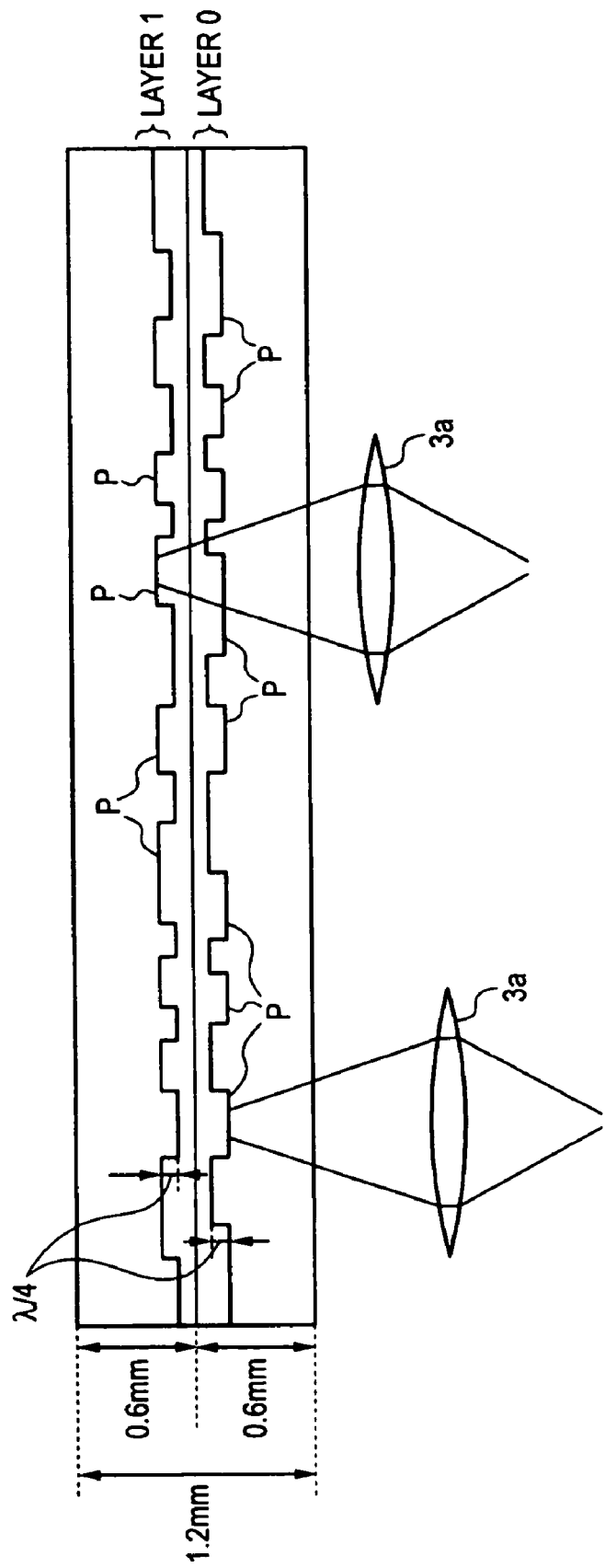

OPTICAL RECORDING MEDIUM, REPRODUCTION APPARATUS, AND TRACKING SERVO METHOD

CROSS-REFERENCES TO RELATED APPLICATIONS

This application contains subject matter related to Japanese Patent Application JP 2004-129380 filed in the Japanese Patent Office on Apr. 26, 2004, the entire contents of which being incorporated herein by reference.

BACKGROUND OF THE INVENTION

1. Field of the Invention

The present invention relates to an optical recording medium such as an optical disk or a magneto-optical disk, which has plural recording layers, and a reproduction apparatus and a tracking servo method for the optical recording medium.

2. Description of the Related Art

As an optical recording medium capable of recording or reproducing information optically, an optical disk is widely known. A semiconductor laser or the like is used as a light source to irradiate light beams condensed finely via a lens on the optical disk, whereby information is recorded in the optical disk or reproduced from the optical disk. As publicly known, a focus servo operation is performed in order to keep laser beams in a focused state with respect a recording layer of the optical disk. In addition, tracking servo is performed such that a laser spot can trace a recording track on the optical disk properly in a state in which focus servo is applied to the optical disk.

The focus servo and the tracking servo are performed by moving an object lens, which is held by a biaxial mechanism (a biaxial actuator) in an optical head, in a direction in which the object lens approaches and separates from the optical disk (a focus direction) and a disk radial direction (a tracking direction) on the basis of a focus error signal and a tracking error signal.

As generation systems for the tracking error signal, there are known systems using a push-pull signal obtained from reflected light information such as a push-pull system and a top hold push-pull (TPP) system and a Differential Phase Detection (DPD) system. In addition, there is also known a three-beam system that calculates a difference of sub-beam reflected light of a three-spot laser.

JP-A-2000-20973 discloses a technique concerning the TPP system.

SUMMARY OF THE INVENTION

Incidentally, in recent years, a multilayer disk structure attracts attentions as a technique for advancing an increase in a recording capacity. For example, as a Digital Versatile Disc (DVD), there is known a two-layer disk in which two recording layers having data recorded therein by pit strings are formed in a disk thickness direction.

FIG. 9 schematically shows a recording layer structure of the two-layer DVD. The two-layer DVD is a disk with a thickness of 1.2 mm formed by sticking together a substrate with a thickness of 0.6 mm in which a recording layer is formed as a layer 0 and a substrate with a thickness of 0.6 mm in which a recording layer is formed as a layer 1.

As shown in the figure, laser beams are irradiated on the layers 0 and 1 serving as recording layers with an object lens 3a in an optical head of a reproduction apparatus as an output end to read information recorded as pit strings in the respective recording layers.

In the case of a ROM type disk with such a structure in which two substrates are stuck together, the layer 1 and the layer 0 have pits with opposite unevenness viewed from a laser incidence side. As shown in the figure, in the layer 0, pits P are formed in a convex shape viewed from the laser incidence side and, in the layer 1, the pits P are formed in a concave shape viewed from the laser incidence side.

In a case considered here, the tracking servo is applied to a pit string of the layer 0 and a pit string of the layer 1. As a generation system for a tracking error signal, various systems are conceivable as described above. However, the DPD system is adopted in the DVD system due to the following reason.

Taking into account the fact that the layers 0 and 1 have pits with opposite unevenness, a push-pull signal obtained from reflected light information is reverse in the case of the layer 0 and the case of the layer 1. On the other hand, the DPD system is a system according to a difference of pit phases, that is, edge detection of pits. Thus, the DPD system is not affected by the opposite unevenness of the pits in the layers 0 and 1. This is a reason why the DPD system is considered suitable.

Further, an RF signal characteristic and a push-pull signal characteristic with respect to a pit depth will be considered. As shown in FIG. 8A, when a depth of the pits P with respect to a laser wavelength $\lambda$ is set to $\lambda/4$, a level of an RF signal (a sum signal of reflected light information: a readout signal of reproduction data) is maximized. In other words, a highest quality RF signal is obtained. On the other hand, when the depth of the pits P is $\lambda/4$, a push-pull signal level is zero.

In a physical format for the DVD, improvement of performance such as improvement of an error rate is realized by setting a pit depth to $\lambda/4$ because a high-quality RF signal is obtained at the pit depth. In this case, a push-pull signal is not obtained. Therefore, it may be impossible to execute a system using a push-pull signal (e.g., the TPP system) as a generation system for a tracking error signal. This is another reason why the DPD system is adopted as the generation system for a tracking error signal.

In short, in the DVD, the pit depth is set to $\lambda/4$ and the DPD system is adopted as the generation system for a tracking error signal after examining the pit unevenness and the RF signal quality in the two-layer disk. In other words, it may be impossible to adopt the generation system for a tracking error signal using a push-pull signal because the pit depth is set to $\lambda/4$. As a result, the DPD system is adopted. The DPD system is also convenience for the two-layer disk.

However, in the DPD system, an error is detected according to a detector phase difference at a switching edge of a pit and a mirror portion. Thus, it is known that an amplifier for an RF band is essential. In that case, high-frequency processing at several tens MHz is required. In addition, compared with other generation systems for a tracking error signal, a voltage is high, power consumption increases, a circuit size increases, and cost increases.

Therefore, it is desirable to realize a tracking servo system that does not use the DPD system in a system that uses an optical recording medium having a recording layer, in which pits are formed in a convex shape viewed from a laser incidence side, and a recording layer, in which pits are formed in a concave shape viewed from the laser incidence side, as recording layers in which data is recorded by pit strings. It is desirable to solve the problems of the high voltage, the increase in power consumption, the increase in a circuit size, and the increase in cost by realizing the tracking servo system.

According to an embodiment of the invention, there is provided an optical recording medium that has a recording layer in which pits are formed in a convex shape viewed from a laser incidence side (a convex pit recording layer) and a recording layer in which pits are formed in a concave shape viewed from the laser incidence side (a concave pit recording layer) as recording layers in which data is recorded by pit strings. In the optical recording medium, the pits are formed with a depth that is set in a range of $\lambda/4.5$ to $\lambda/6$ with respect to a laser wavelength $\lambda$.

According to another embodiment of the invention, there is provided a reproduction apparatus for the optical recording medium including: an optical head section that irradiates laser beams on the recording layers with an object lens as an output end and detects reflected light information of the laser beams to read out information recorded in the respective recording layers; a tracking error signal generating section that generates a tracking signal using a push-pull signal component obtained from the reflected light information read out by the optical head section; a polarity switching section that switches a polarity of the tracking error signal generated by the tracking error signal generating section according to whether a recording layer on which laser irradiation is executed by the optical head section is the convex pit recording layer or the concave pit recording layer; and a tracking servo section that performs a tracking servo operation by driving the object lens in a disk radial direction on the basis of the tracking error signal supplied via the polarity switching section.

In particular, the tracking error signal generating section removes an offset component from the push-pull signal component to generate a tracking error signal. In other words, the tracking error signal generating section generates a tracking error signal in the TPP system.

According to still another embodiment of the invention, there is provided a tracking servo method for the optical recording medium including the steps of: irradiating laser beams on the recording layers with an object lens as an output end and generating a tracking signal using a push-pull signal component obtained from the reflected light information of the laser beams (e.g., in the TPP system); switching a polarity of the tracking error signal according to whether a recording layer on which laser irradiation is executed is the convex pit recording layer or the concave pit recording layer; and performing a tracking servo operation by driving the object lens in a disk radial direction on the basis of the tracking error signal obtained through the polarity switching step.

In the optical recording medium, a depth of the pits is set in a range of $\lambda/4.5$ to $\lambda/6$ such that a push-pull signal of a necessary level is obtained. A tracking error signal is generated by a system using a push-pull signal, for example, the TPP system rather than the DPD system. In addition, a polarity of the tracking error signal is switched according to whether a recording layer is a convex pit recording layer or a concave pit recording layer to cope with a difference of unevenness of the pits in each layer.

BRIEF DESCRIPTION OF THE DRAWINGS

In the accompanying drawings:

FIG. 9 is a diagram for explaining recording layers of a DVD.

DESCRIPTION OF THE PREFERRED EMBODIMENTS

Embodiments of the present invention will be hereinafter explained in detail with reference to the accompanying drawings.

Figure 1:
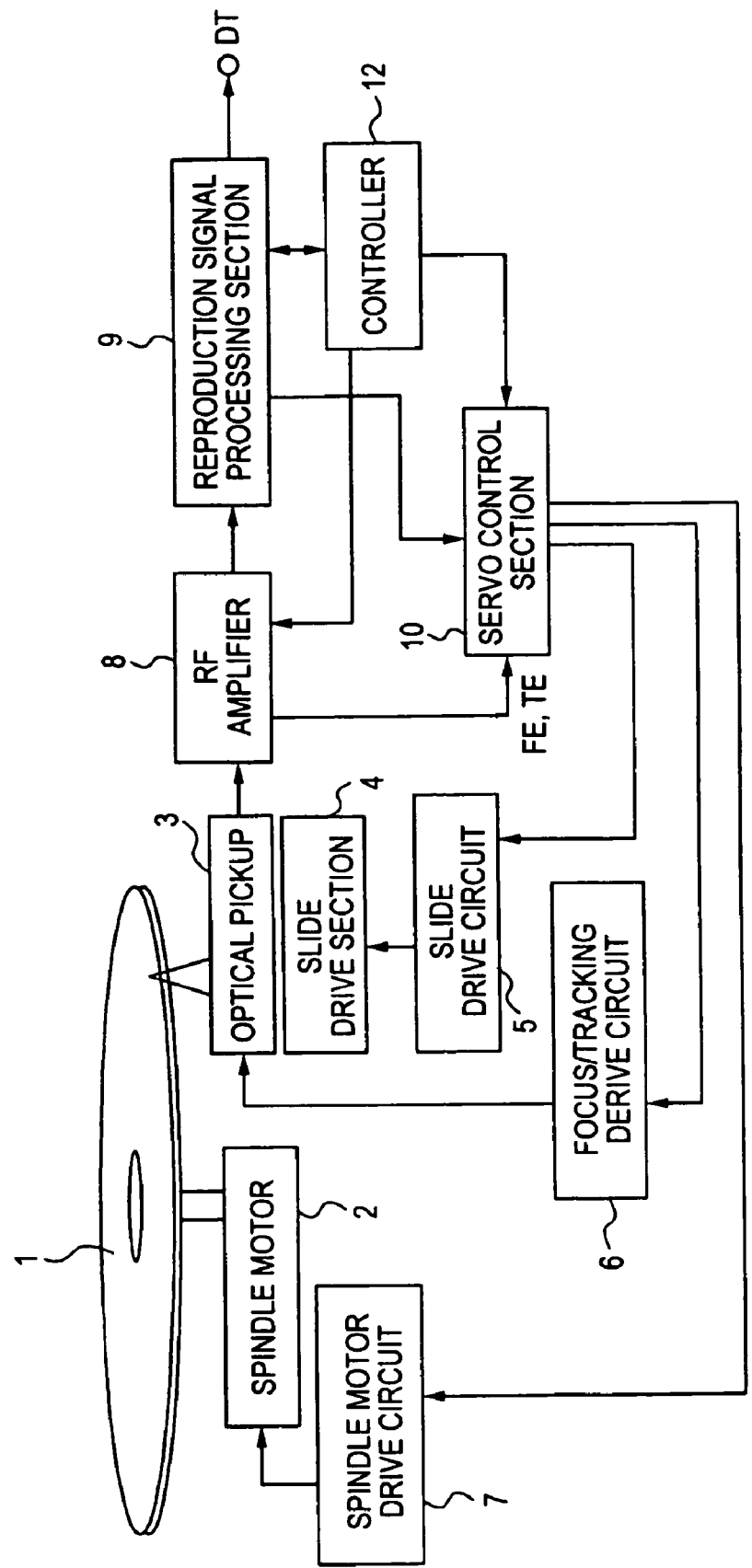
FIG. 1 is a block diagram of a reproduction apparatus in an embodiment of the invention.
Figure 2:
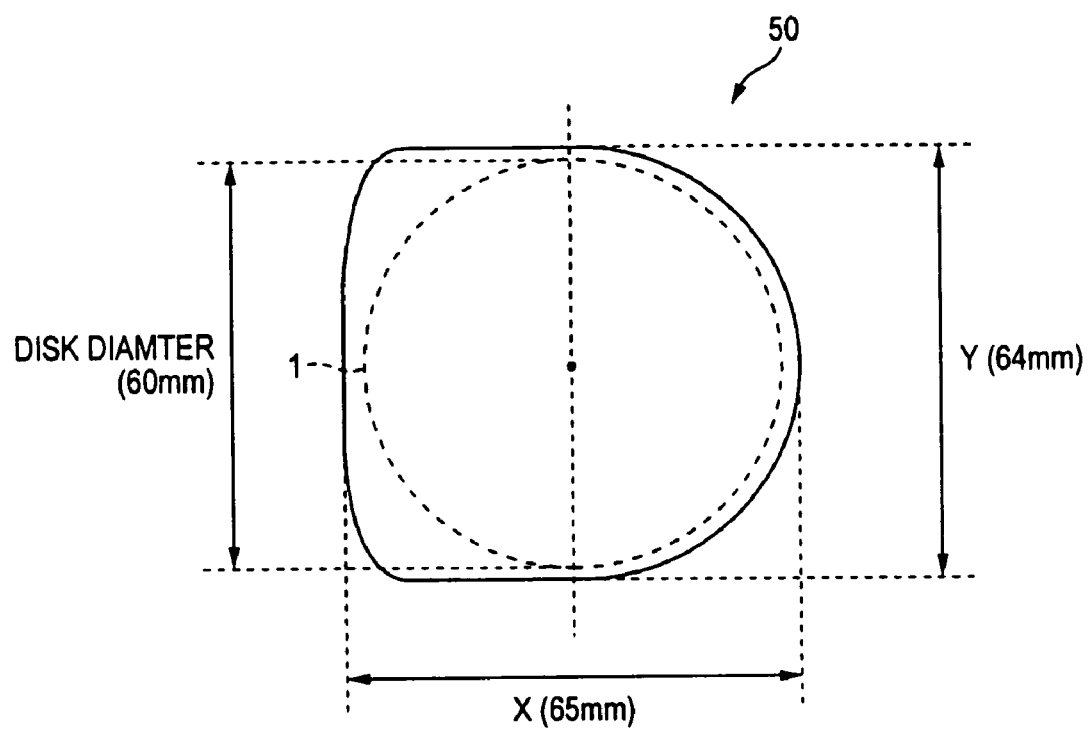
FIG. 2 is a diagram for explaining a structure of a disk in the embodiment.
Figure 3A:
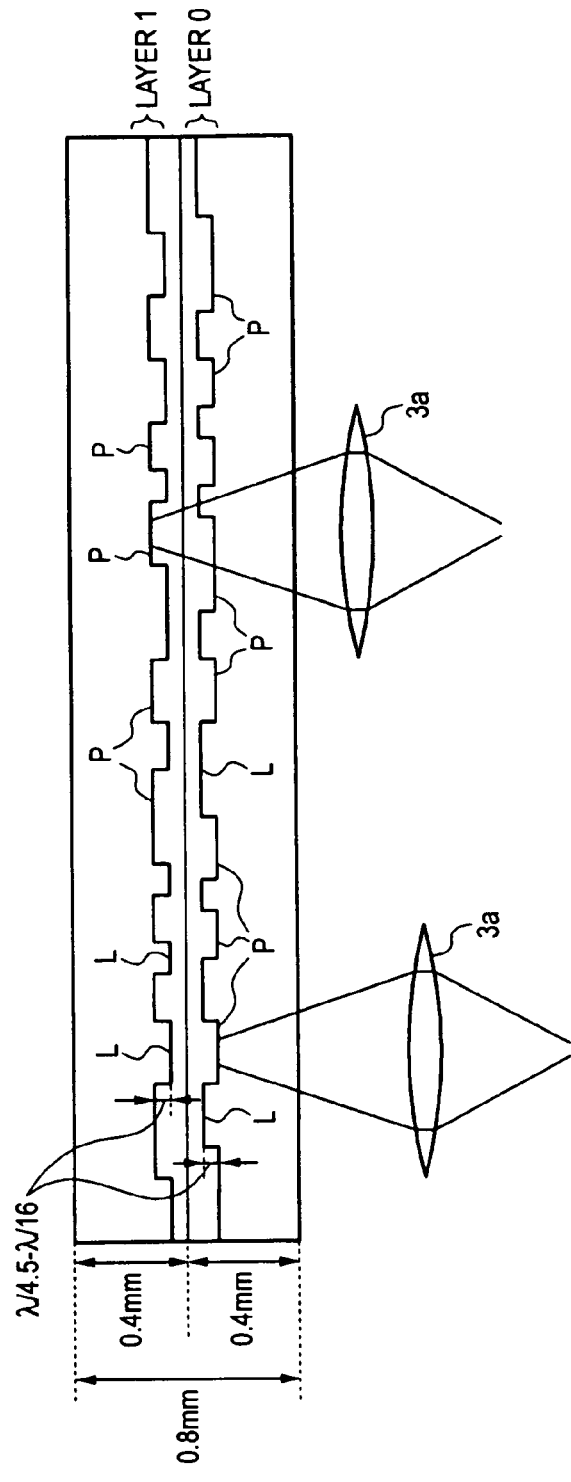
FIGS. 3A and 3B are diagrams for explaining a recording layer of the disk in the embodiment.
Figure 3B:
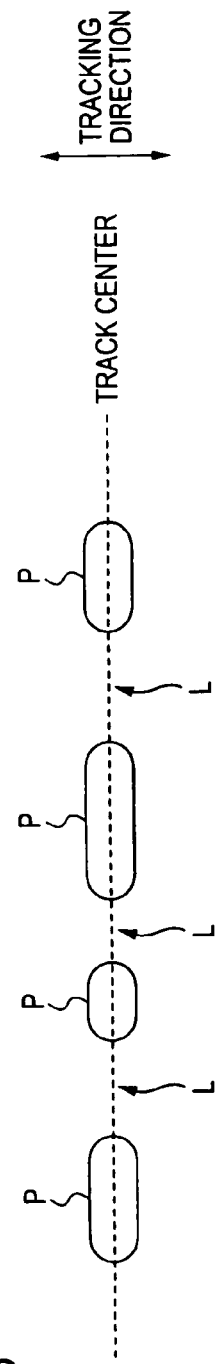

FIG. 1 is a block diagram of a reproduction apparatus in an embodiment of the invention. FIG. 2 and FIGS. 3A and 3B show a disk and recording layers of the disk from which the reproduction apparatus in this embodiment reproduces information.

First, a disk 1 will be explained with reference to FIG. 2 and FIGS. 3A and 3B.

As shown in FIG. 2, the disk 1 is adapted to be housed in a disk cartridge 50.

The disk 1 is housed in the disk cartridge 50 as indicated by a broken line in the figure. The disk 1 has a diameter of about 60 mm and has a data storage capacity of about 1.6 GB (gigabyte) according to, for example, a two-layer recording system.

As shown in the figure, the disk cartridge 50 is formed in a semicircular shape along an arc of the disk 1 housed therein in one half side on a plane thereof. In addition, in another half side, the disk cartridge 50 is formed in substantially a square shape with two corners formed in substantially a rounded C shape on an external side. A size in an X direction is set to about 65 mm and a size in a Y direction is set to about 64 mm in the figure.

As shown in FIG. 3A, the disk 1 has a layer 0 and a layer 1 as two recording layers. The disk 1 has a structure in which disks with a thickness of, for example, 0.4 mm are stuck together. Thus, a thickness of the disk 1 is 0.8 mm.

The layer 0 and the layer 1 are formed in order from a disk surface side on which laser beams are irradiated by an optical pickup 3 of the reproduction apparatus.

In reproducing information from such a two-layer disk, laser beams, which are emitted from the optical pickup 3 via an object lens 3a, are focused on one of the recording layers to read out reflected light information from the recording layer. FIG. 3A schematically shows a state of focus on the layer 0 at the time of reproduction and a state of focus on the layer 1 at the time of reproduction.

As shown in FIG. 3B, information is recorded in the layer 0 and the layer 1 serving as the recording layers by pit strings in which pits P and land portions L are formed in a track line direction. In the case of a so-called ROM type disk, the pits P are emboss pits.

Since two substrates with the pit strings formed therein are stuck together to form the disk, the pits P are formed in a convex shape in the layer 0 and formed in a concave shape in the layer 1 viewed from the object lens 3a side (a laser incidence surface side).

In the disk 1 in this embodiment, a depth of the pits P is set in a range of $\lambda/4.5$ to $\lambda/6$ with respect to a laser wavelength $\lambda$. For example, the depth is set to $\lambda/5.33$ $(=3\lambda/16)$.

Figures 8A, 8B:
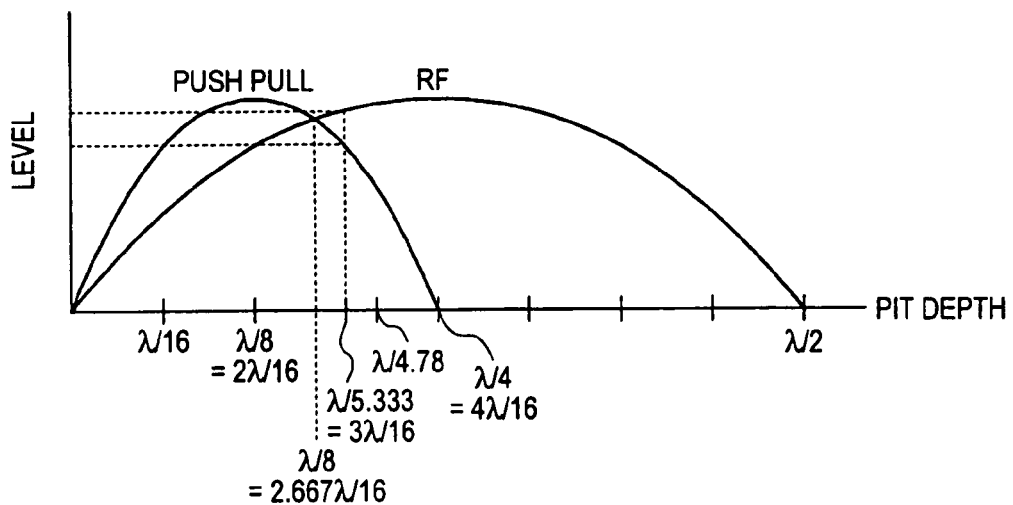
FIGS. 8A and 8B are diagrams for explaining characteristics of an RF signal and a push-pull signal with respect to a pit depth.

Here, FIGS. 8A and 8B show a relation between a pit depth and an RF signal and a push-pull signal.

In FIG. 8A, a horizontal axis indicates the pit depth and a vertical axis indicates a signal level. FIG. 8B shows phases and levels of the RF signal and the push-pull signal with respect to the pit depth, which are characteristics in FIG. 8A, in a form of a table.

As described above, in the case of the DVD, the pit depth is set to $\lambda/4$. In this case, the RF signal level is the highest (RF level=1) but the push-pull signal level is 0.

Concerning the RF signal characteristic, it is needless to mention that the RF signal level is the highest when the pit depth is $\lambda/4$, which is optimum in terms of a signal quality such as improvement of an error rate.

However, it has been verified that, even if the RF signal level is practically about 0.8 (when it is assumed that the RF signal level at the pit depth of $\lambda/4$ is 1), a reproduction operation is hardly hindered. In other words, the error rate is not deteriorated significantly.

On the other hand, the push-pull signal level is the highest (push-pull signal level=1) when the pit depth is $\lambda/8$. However, in this case, the RF level is about 0.7, which is not a very appropriate level.

When it is attempted to use the push-pull signal for generation of a tracking error signal, it is desirable that the push-pull signal level is at least about 0.4.

Here, taking into account the respective levels of the RF signal and the push-pull signal, appropriate ranges of the levels are about 0.8 or more for the RF level and about 0.4 or more for the push-pull signal level. Then, it can be considered that a range of $\lambda/4.5$ to $\lambda/6$ is appropriate for the pit depth.

In this embodiment, for example, when the pit depth is set to $\lambda/5.33$ within the range, it is possible to obtain a satisfactory level as the RF signal and generate a tracking error signal using the push-pull signal.

Note that it is needless to mention that the pit depth is not limited to $\lambda/5.33$ and it is possible to obtain a satisfactory level as the RF signal and generate a tracking error signal using the push-pull signal as long as the pit depth is within the range of $\lambda/4.5$ to $\lambda/6$.

A structure of a reproduction apparatus for such a disk 1 will be explained with reference to FIG. 1.

The disk 1 is mounted on a not-shown turntable and is driven to rotate at a constant linear velocity (CLV) or a constant angular velocity (CAV) by a spindle motor 2 at the time of a reproduction operation. Then, data recorded in the disk 1, for example, in an emboss pit format is read out by the pickup (the optical head) 3.

Figure 4:
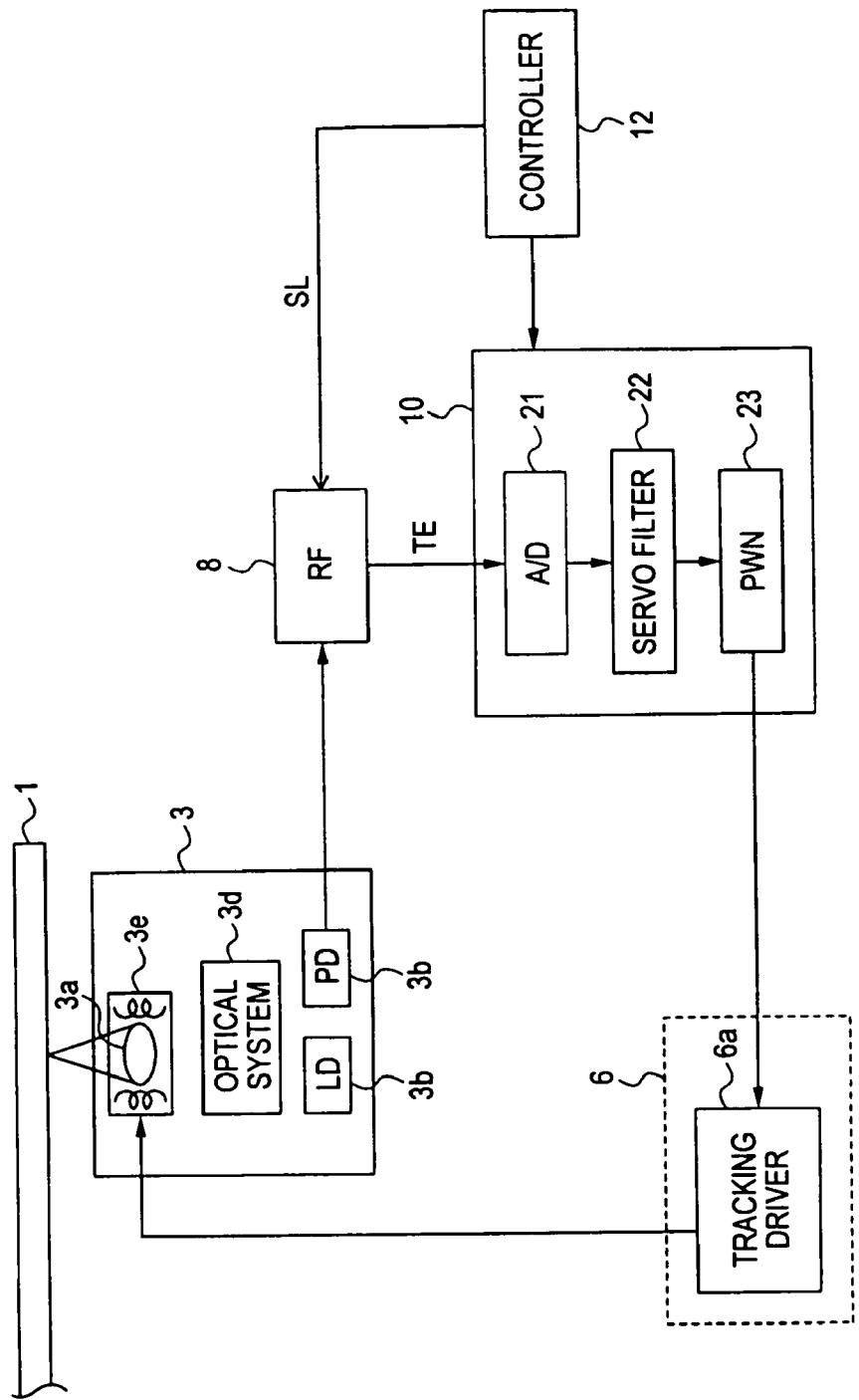
FIG. 4 is a block diagram of a tracking control system in the embodiment.

As schematically shown in FIG. 4, a laser diode 3b serving as a laser beam source, a photo-detector 3c for detecting reflected light, an object lens 3a serving as an output end of laser beams, an optical system 3d that irradiates the laser beams on a disk recording surface via the object lens 3a and guides reflected light of the laser beams to the photo-detector 3c, a biaxial mechanism 3e that holds the object lens 3a so as to be movable in a tracking direction and a focus direction, and the like are formed in the pickup 3.

The entire pickup 3 is made movable in a disk radial direction by a slide drive section 4.

Reflected light information from the disk 1 is detected by the photo-detector 3c, changed to an electric signal corresponding to an amount of received light, and supplied to an RF amplifier 8.

The RF amplifier 8 shown in FIG. 1 includes a current voltage conversion circuit, a matrix operational amplifier circuit, and the like in association with output currents from plural photo-detectors 3c in the pickup 3. The RF amplifier 8 generates a necessary signal according to matrix operation processing. The RF amplifier 8 generates an RF signal serving as reproduction data, a focus error signal FE and a tracking error signal TE for servo control, and the like.

The reproduction RF signal outputted from the RF amplifier 8 is supplied to a reproduction signal processing section 9 and the focus error signal FE and the tracking error signal TE are supplied to a servo control section 10.

The reproduction RF signal obtained by the RF amplifier 8 is subjected to binarization, PLL clock generation, decode processing, error correction processing, and the like in the reproduction signal processing section 9. Reproduction data DT from the disk 1 is obtained by these pieces of processing and outputted to a predetermined portion or an external apparatus.

In addition, the reproduction signal processing section 9 extracts sub-code information and address information from information obtained by decoding and error correction applied to the RF signal and supplies these pieces of information to a controller 12.

The controller 12 is formed by, for example, a microcomputer and performs control for the entire apparatus.

The servo control section 10 is formed by, for example, a Digital Signal Processor (DSP). The servo control section 10 generates various servo derive signals such as focus, tracking, thread, spindle signals from the focus error signal FE and the tracking error signal TE received from the RF amplifier 8 and a spindle error signal SPE or the like from the reproduction signal processing section 9 or the controller 12 to execute a servo operation.

In other words, the servo control section 10 generates a focus drive signal and a tracking drive signal in response to the focus error signal FE and the tracking error signal TE and supplies the focus drive signal and the tracking drive signal to a focus/tracking drive circuit 6. The focus/tracking drive circuit 6 drives a focus coil and a tracking coil of the biaxial mechanism 3 in the pickup 3. Consequently, a tracking servo loop and a focus servo loop are formed by the pickup 3, the RF amplifier 8, the servo control section 10, the focus/tracking drive circuit 6, and the biaxial mechanism 3e.

Note that, in turning ON the focus servo, first, a focus search operation has to be executed. The focus search operation is an operation for detecting a position, where a zero cross point of an S waveform of the focus error signal FE can be obtained, while forcibly moving an object lens in a state in which the focus servo is OFF. As it is publicly known, linear areas in front of and behind the zero cross point in the S waveform of the focus error signal are areas in which a position of the object lens 3a can be drawn into a focus position by closing the focus servo loop. Therefore, the focus servo is turned ON at timing of the zero cross point while forcibly moving the object lens 3a as the focus search operation, whereby a focus servo operation holding a laser spot in a focus state is realized after the focus servo is turned ON.

In the case of this embodiment, the disk 1 is formed in the two-layer structure including the layer 0 and the layer 1 as described above.

Naturally, when record reproduction is applied to the layer 0, laser beams has to be focused on the layer 0. When record reproduction is applied to the layer 1, laser beams has to be focused on the layer 1.

Movement of a focus position between the layer 0 and the layer 1 is performed by a focus jump operation.

The focus jump operation is executed by, when laser beams are focused on one layer, turning OFF the focus servo to forcibly move the object lens 3a and turning ON the focus servo at timing of the zero cross point of the S waveform with respect to the other layer.

The servo control section 10 supplies a spindle drive signal, which is generated in response to the spindle error signal, to a spindle motor drive circuit 7. The spindle motor drive circuit 7 applies, for example, a three-phase drive signal to the spindle motor 2 in response to the spindle drive signal to execute rotation of the spindle motor 2. In addition, the servo control section 10 generates a spindle drive signal in response to a spindle kick/brake control signal from the controller 12 and executes operations such as start, stop, acceleration, and deceleration of the spindle motor 2 by the spindle motor drive circuit 7.

Further, the servo control section 10 generates a slide drive signal on the basis of, for example, a slide error signal obtained as a low-frequency component of the tracking error signal TE or access execution control from the controller 12 and supplies the slide drive signal to a slide drive circuit 5. The slide drive circuit 5 drives the slide drive section 4 in response to the slide drive signal. Although not shown in the figure, the slide drive section 4 has a mechanism including a main shaft, a thread motor, and a transmission gear for holding the pickup 3. The slide drive circuit 5 drives the slide drive section 4 in response to the slide drive signal, whereby required slide movement of the pickup 3 is performed.

A structure of the tracking loop will be explained with reference to FIG. 4.

In FIG. 4, as the servo control section 10, only a tracking servo system therein is shown. As the focus/tracking drive circuit 6, only a tracking driver 6a is shown.

The tracking servo system in this context is a system for performing tracking servo on the basis of the tracking error signal TE. Therefore, the servo control section 10 includes an A/D conversion section 21, a servo filter 22, and a PWM modulation section 23.

The structure in the pickup 3 is described above. The object lens 3a is moved by the biaxial mechanism 3e in the tracking direction.

The tracking error signal TE, which is obtained by applying arithmetic operation processing in the RF amplifier 8 to a signal received by the photo-detector 3c, is converted into digital data by the A/D conversion section 21 in the servo control section 10 and supplied to the servo filter 22.

The servo filer 22 applies filtering processing for phase compensation or the like to the tracking error signal TE to generate a tracking servo signal.

When this tracking servo loop is ON, the tracking servo signal generated by the servo filter 22 is supplied to the PWM modulation section 23 and changed to a PWM signal. The PWM signal is supplied to the tracking driver 6a of the focus/tracking drive circuit 6. The tracking driver 6a applies an electric current to a tracking coil of the biaxial mechanism 3e on the basis of the supplied PWM signal. Consequently, the tracking servo operation for causing a laser spot to trace tracks of recording layers is performed.

Note that the controller 12 instructs the servo control section 10 to turn ON the tracking servo loop or execute a track jump operation by turning OFF the tracking servo loop.

In this way, the tracking servo is executed when the tracking error signal TE is supplied to the servo control section 10. The tracing error signal TE is generated in the TPP system by, for example, processing in the RF amplifier 8.

According to the difference of unevenness of pits in the layer 0 and the layer 1, a polarity switching control signal SL is supplied to a tracking error signal generation circuit system of the RF amplifier 8 from the controller 12. This polarity switching control signal SL serves as information indicating whether a track, which is being traced by a laser spot currently, is a track of the layer 0 or a track of the layer 1.

A structure and an operation for generation of the tracking error signal TE will be explained.

Figure 5A:
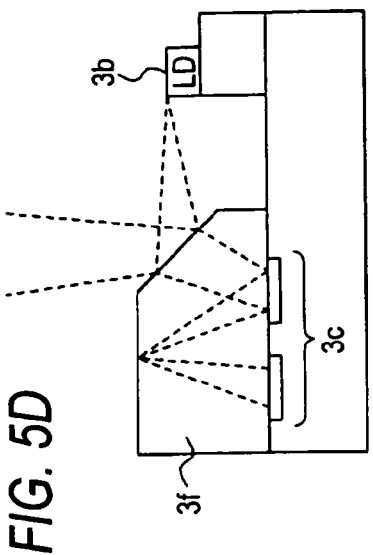
FIGS. 5A to 5D are diagrams for explaining light-receiving patterns of a photo-detector in the embodiment.

FIG. 5A shows an example of a pattern of a light-receiving section of the photo-detector 3c in the pickup 3.

Figure 5D:
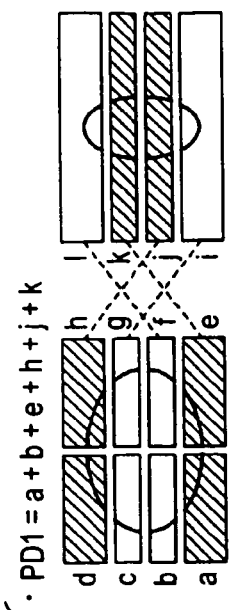

For example, in the pickup 3, a laser coupler as shown in FIG. 5D is provided. The laser coupler has a laser diode 3b, two photo-detectors 3c, and a prism 3f, which are integrally formed.

Laser beams outputted from the laser diode 3b is reflected on a slope of the prism 3f and guided to the object lens 3e side. Reflected light from the disk 1 is made incident on the inside of the prism 3f from the slope of the prism 3f and made incident on the two photo-detectors 3c through an optical path shown in the figure.

The pattern in FIG. 5A is a pattern of the two photo-detectors 3c. For example, a photo-detector having a, b, c, d, e, f, g, and h as divided light-receiving sections and a photo-detector having i, j, k, and l as divided light-receiving sections are provided.

Figure 5B:
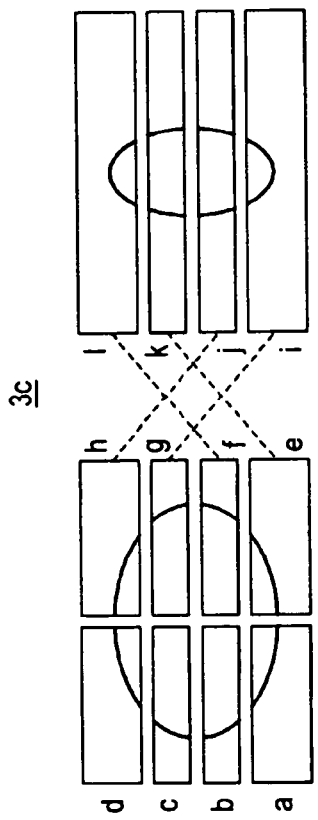
Figure 5C:
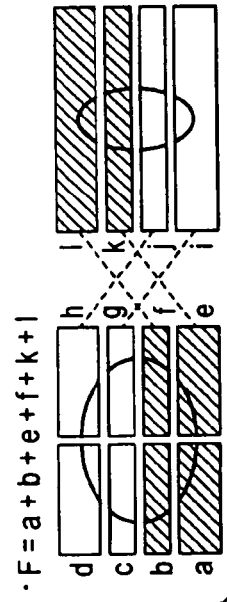

In the case of the two photo-detectors 3c having such light-receiving sections, signals E and F shown in FIG. 5B and signals PD1 and PD2 shown in FIG. 5C are generated by an arithmetic operation using signals from the respective light-receiving sections.

The signals PD1 and PD2 shown in FIG. 5C are used for generation of the RF signal and the focus error signal FE.

The respective light-receiving sections a to l generate electric signals corresponding to an amount of received light according to photoelectric conversion. When the signals outputted form the respective light-receiving sections a to l are represented by a to l directly, the signal PD1 is represented by an expression PD1=a+d+e+h+j+k. In addition, the signal PD2 is represented by an expression PD2=b+c+f+g+i+l.

For example, in the RF amplifier 8, the signals PD1 and PD2 are subjected to addition to generate the RF signal (RF signal=PD1+PD2). The signals PD1 and the PD2 are subjected to subtraction to generate the focus error signal FE (FE=PD1−PD2).

Signals E and F shown in FIG. 5B are used for generation of the tracking error signal TE.

First, the signal E is represented by an expression E=c+d+g+h+i+j. The signal F is represented by an expression F=a+b+e+f+k+l.

Figure 6:
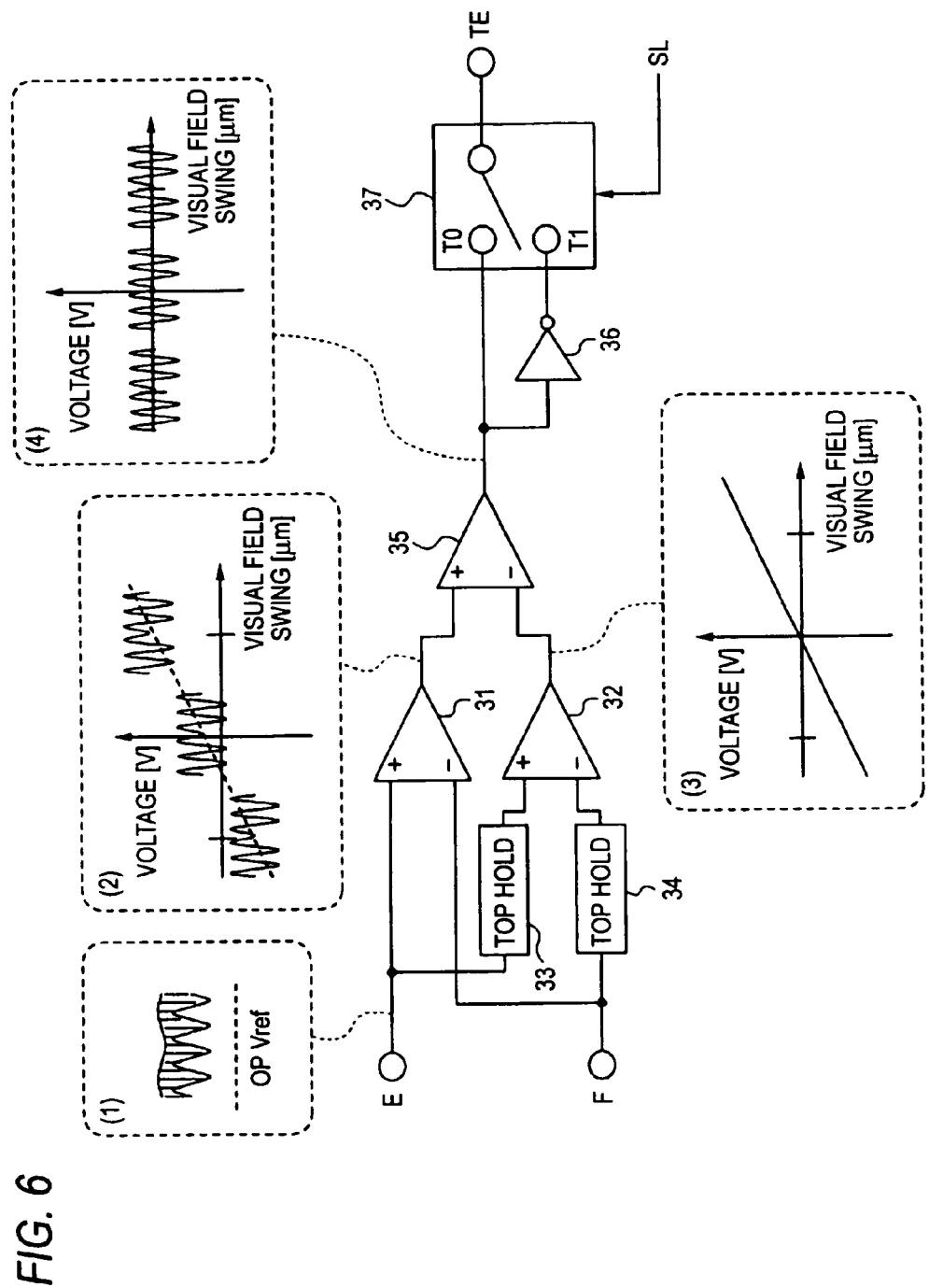
FIG. 6 is a block diagram of a tracking error signal generating circuit system in the embodiment.

The signals E and F are used in a circuit shown in FIG. 6 in the RF amplifier 8 to generate the tracking error signal TE of the TPP system.

As shown in FIG. 6, subtraction amplifiers 31, 32, and 35, top hold circuits 33 and 34, a reverse amplifier 36, and a switch 37 are provided as a circuit system for generating the tracking error signal TE.

The signals E and F having an envelope as shown in a broken line area (1) are subjected to subtraction (E−F) by the subtraction amplifier 31 to be changed to a push-pull signal. Note that, as publicly known, an offset component is generated in the push-pull signal by visual field swing of the object lens 3a. A state in which a push-pull signal amplitude is offset according to an amount of visual field swing is shown in a broken line area (2) as an output of the subtraction amplifier 31.

The top hold circuits 33 and 34 apply peak hold to the signals E and F, respectively, for example, after low-pass filter processing. Then, outputs of the top hold circuits 33 and 34 are subjected to subtraction by the subtraction amplifier 32. An output of the subtraction amplifier 32 is a signal indicating an offset component corresponding to the amount of visual field swing as shown in a broken line area (3).

The subtraction amplifier 35 subtracts the offset component outputted from the subtraction amplifier 32 from the push-pull signal outputted from the subtraction amplifier 31. Therefore, an output of the subtraction amplifier 35 is the tracking error signal TE of the TPP system from which the offset component corresponding to the amount of visual field swing is removed as shown in a broken line area (4).

The tracking error signal TE outputted from the subtraction amplifier 35 is supplied to a terminal T0 of the switch 37 and the reverse amplifier 36. An output of the reverse amplifier 36 is supplied to a terminal T1 of the switch 37.

As described above, it is assumed that the pits P in the layer 0 of the disk 1 are formed in a convex shape and the pits P of the layer 1 are formed in a concave shape. Then, polarities of the push-pull signal and the tracking error signal TE generated from the push-pull signal are reverse at the time of tracing of the layer 0 and at the time of tracing of the layer 1.

Figure 7A:
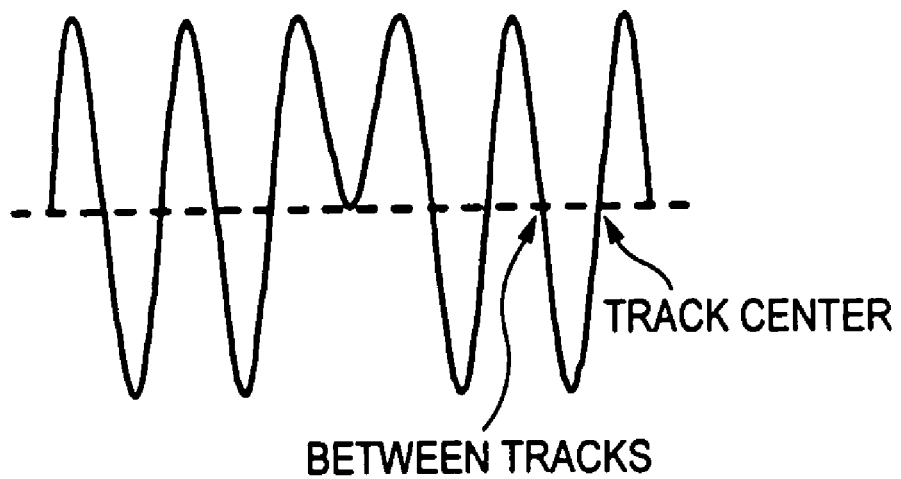
FIGS. 7A and 7B are diagrams for explaining a polarity of a tracking error system in the embodiment.
Figure 7B:
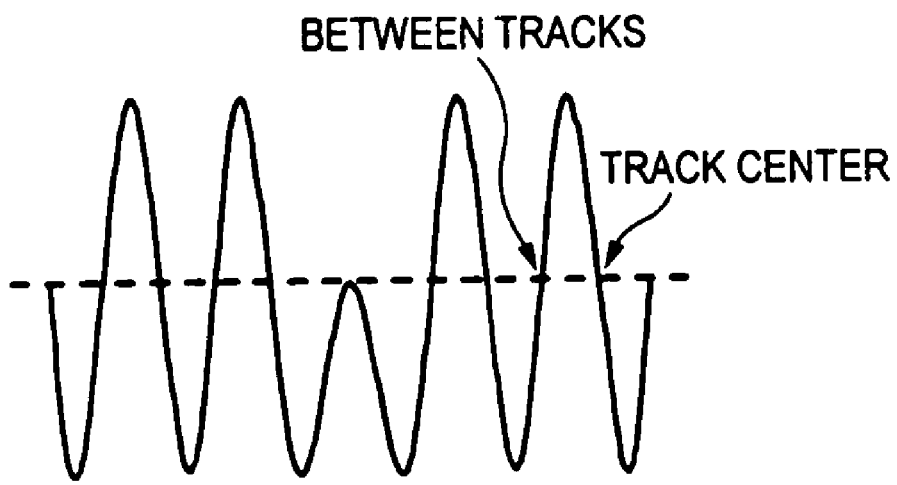

FIGS. 7A and 7B show examples of a waveform of the tracking error signal TE outputted from the subtraction amplifier 35 in the cases of the layer 1 and the layer 0, respectively. Since a polarity is reversed, points on error signals corresponding to track centers are different. In the case of the layer 0, a zero cross point at a rising edge of a waveform indicates an on-track state. In the case of the layer 1, a zero cross point at a falling edge indicates an on-track state.

Thus, the switch 37 is switched according to the layers 0 and 1 such that the tracking error signal TE with a common polarity can be obtained regardless of whether a recording layer, from which information is being reproduced, is the layer 0 and the layer 1.

The switch 37 is switched by the polarity switching control signal SL from the controller 12. The terminal T0 is selected at the time of reproduction of information from the layer 0. Therefore, the tracking error signal TE with the polarity in FIG. 7A is outputted from the switch 37 and supplied to the servo control section 10.

At the time of reproduction of information from the layer 1, the terminal T1 is selected. Therefore, the polarity in FIG. 7B of the tracking error signal TE is reversed to the polarity in FIG. 7A by the reverse amplifier 36 and the tracking error signal TE is supplied to the servo control section 10 from the switch 37.

Therefore, the tracking error signal TE with a common polarity is supplied to the servo control section 10 regardless of whether a recording layer, from which information is being reproduced, is the layer 0 and the layer 1. The tracking servo is performed on the basis of the processing of the servo control section 10.

According to the embodiment, it is possible to generate the tracking error signal TE according to the TPP system and apply the tracking error signal TE to the disk 1 that has the convex pit recording layer (the layer 0), in which the pits are formed in a convex shape viewed from the laser incidence surface side, and the concave pit recording layer (the layer 1), in which the pits are formed in a concave shape viewed from the laser incidence surface side, as recording layers in which data are recorded by pit strings.

In addition, it is possible to realize a lower voltage, lower power consumption, a reduction in a circuit size, and a reduction in cost for the reproduction apparatus by adopting the TPP system rather than the DPD system.

The embodiment has been explained. However, it is possible to apply the tracking servo method according to the embodiment not only to the read-only apparatus but also to a recording/reproduction apparatus.

The reproduction apparatus according to the embodiment is suitable as a reproduction apparatus and a recording/reproduction apparatus not only for the disk 1 but also for other types of recording media such as an optical disk, a magneto-optical disk, and an optical card that include two recording layers.

Moreover, it is needless to mention that the invention can be applied as a reproduction apparatus and a tracking servo method for various recording media that has a multilayer structure including three or more recording layers.

It should be understood by those skilled in the art that various modifications, combinations, sub-combinations, and alterations may occur depending on design requirements and other factors insofar as they are within the scope of the appended claims or the equivalents thereof.

What is claimed is:

1. An optical recording medium comprising a recording layer, in which pits are formed in a convex shape viewed from a laser incidence side, and a recording layer, in which pits are formed in a concave shape viewed from the laser incidence side, as recording layers in which data is recorded by pit strings, wherein the pits are formed with a depth that is set in a range of $\lambda/4.5$ to $\lambda/6$ with respect to a laser wavelength $\lambda$, wherein a thickness of the optical recording medium is 0.8 mm.

* * * * *